(12) United States Patent
Albert et al.

(10) Patent No.: US 10,387,004 B2
(45) Date of Patent: Aug. 20, 2019

(54) REAL TIME MONITORING OF USERS WITHIN A PREDETERMINED RANGE AND SELECTIVE RECEIPT OF VIRTUAL CARDS

(71) Applicants: Jimmy Albert, Tahiti (PF); Chi Huynh, San Dimas, CA (US)

(72) Inventors: Jimmy Albert, Tahiti (PF); Chi Huynh, San Dimas, CA (US)

( * ) Notice: Subject to any disclaimer, the term of this patent is extended or adjusted under 35 U.S.C. 154(b) by 744 days.

(21) Appl. No.: 14/690,367

(22) Filed: Apr. 17, 2015

(65) Prior Publication Data
US 2015/0326623 A1  Nov. 12, 2015

Related U.S. Application Data

(60) Provisional application No. 61/981,042, filed on Apr. 17, 2014.

(51) Int. Cl.
| | | |
|---|---|---|
| G06F 3/048 | (2013.01) | |
| G06F 3/0484 | (2013.01) | |
| H04L 29/06 | (2006.01) | |
| G06F 3/0482 | (2013.01) | |
| H04L 29/08 | (2006.01) | |
| G06F 3/0488 | (2013.01) | |
| G06Q 10/10 | (2012.01) | |

(Continued)

(52) U.S. Cl.
CPC .......... *G06F 3/0484* (2013.01); *G06F 3/0482* (2013.01); *G06F 3/0488* (2013.01); *G06F 3/04842* (2013.01); *G06Q 10/10* (2013.01); *H04L 65/403* (2013.01); *H04L 67/10* (2013.01); *H04L 67/306* (2013.01); *H04W 4/022* (2013.01); *H04W 4/023* (2013.01); *H04W 4/20* (2013.01)

(58) Field of Classification Search
CPC .. G06Q 20/351; G06Q 30/04; G06Q 30/0601; H04L 51/38; H04L 51/063; G06F 3/0482; G06F 16/29
See application file for complete search history.

(56) References Cited

U.S. PATENT DOCUMENTS

| | | | | |
|---|---|---|---|---|
| 8,879,092 | B2 * | 11/2014 | Gha | ..................... H04M 1/7253 358/1.15 |
| 2004/0266347 | A1 * | 12/2004 | Palin | ....................... H04L 63/18 455/41.1 |

(Continued)

OTHER PUBLICATIONS

Lin et al., Effects of cache mechanism on wireless data access; IEEE; 2013; 12 pages.*

(Continued)

*Primary Examiner* — Linh K Pham
(74) *Attorney, Agent, or Firm* — Wagenknecht IP Law Group PC (57) ABSTRACT

Methods of selectively distributing virtual cards between mobile devices, comprising providing a plurality of mobile devices assigned to a plurality of users, wherein a software program manages a user account comprising a collection virtual cards, wherein the virtual cards include different profiles of a same user, wherein the account further comprises a user appearance generated from at least one virtual card for transmission to surrounding mobile devices; selectively displaying the user appearance on a surrounding device only if the original sending device and surrounding device are within a predetermined range; and sending a virtual card to a user associated with a user appearance.

18 Claims, 8 Drawing Sheets

(51) Int. Cl.
*H04W 4/021* (2018.01)
*H04W 4/02* (2018.01)
*H04W 4/20* (2018.01)

(56) References Cited

U.S. PATENT DOCUMENTS

| | | | | |
|---|---|---|---|---|
| 2005/0281237 | A1* | 12/2005 | Heinonen | H04L 29/06 370/338 |
| 2009/0181653 | A1* | 7/2009 | Alharayeri | H04W 4/02 455/414.1 |
| 2010/0063906 | A1* | 3/2010 | Nelsen | G06Q 20/28 705/30 |
| 2010/0082487 | A1* | 4/2010 | Nelsen | G06Q 20/10 705/44 |
| 2012/0290449 | A1* | 11/2012 | Mullen | G06Q 10/00 705/27.2 |
| 2013/0054690 | A1* | 2/2013 | Wei | G06Q 10/107 709/204 |
| 2013/0132217 | A1* | 5/2013 | Yahn | G07F 17/26 705/17 |
| 2013/0205191 | A1* | 8/2013 | Ramachandran | G06F 17/243 715/226 |
| 2013/0214939 | A1* | 8/2013 | Washlow | G01S 7/003 340/901 |
| 2013/0282438 | A1* | 10/2013 | Hunter | G01S 1/02 705/7.32 |
| 2014/0012917 | A1* | 1/2014 | Baca | G06O 50/30 709/204 |
| 2015/0029554 | A1* | 1/2015 | Gha | H04M 1/7253 358/1.15 |
| 2015/0032655 | A1* | 1/2015 | Said | G06Q 10/1053 705/321 |
| 2015/0100636 | A1* | 4/2015 | Hong | H04L 67/02 709/204 |
| 2015/0142591 | A1* | 5/2015 | High | G06Q 30/0613 705/21 |

OTHER PUBLICATIONS

Sunder et al., Voice over IP via Bluetooth/Wi-Fi Peer to Peer, IEEE, 2012; 10 pages.*

* cited by examiner

REAL TIME MONITORING OF USERS WITHIN A PREDETERMINED RANGE AND SELECTIVE RECEIPT OF VIRTUAL CARDS

CROSS REFERENCE TO RELATED APPLICATIONS

This invention claims benefit of priority to U.S. provisional patent application Ser. No. 61/981,042 filed Apr. 17, 2014, the entirety of which is herein incorporated by reference.

TECHNICAL FIELD

The invention relates generally to the wireless communication between two devices and more specifically to the selective wireless distribution of a virtual card to a particular mobile device among a pool mobile devices.

BACKGROUND OF THE INVENTION

Business cards are typically small cards printed with one's name, professional occupation, company position, business address and other contact information. Business cards are often given out between colleagues at tradeshows, seminars, conventions, networking events and other events where professionals gather. Time at such events is limited and therefore attendees, venders and service providers must work to quickly identify other professionals of interest for effective distribution of business cards.

A common problem with the above is that individuals must personally introduce themselves and begin a discussion to determine whether the other party is the correct audience to receive a business card. If not, the individual may have missed an opportunity speaking to an appropriate person that is no longer nearby or in some cases it can be socially awkward to try and leave a discussion early.

Electronic communication between mobile devices is itself well known in the art; however, adapting such an approach for the selective delivery of virtual cards to particular members of a larger pool of members still raises challenges. First, there is a challenge in selectively delivering the virtual card to a limited audience. That is, a general approach of offering a virtual business card to everyone fails to specifically target a particular audience. However identifying the target audience is itself challenging. Typically, identifying the proper audience would first require personal interaction to screen the audience for appropriate members. This again brings about the above challenges associated with distributing printed business cards. Therefore there remains a need for the targeted distribution of virtual cards in an efficient manner.

SUMMARY OF THE INVENTION

The invention provides methods and systems to provide an alternative approach to the conventional exchange of business and other physical cards, where a virtual card is transmitted electronically between users and stored in a database of contacts. The method and system includes two phases. The first phase identifies users that are available to receive virtual cards by displaying an appearance on a mobile device corresponding to the user within a predetermined range or area. The second phase selectively delivers a virtual card to users selected from those having an available user appearance. The user from the user appearance can then accept, reject or send a return virtual card. Both the user appearance and virtual card are in the form of a computer readable medium, such as in electronic file configured for wireless transmission between mobile devices. Examples of suitable devices include mobile phones, tablet computers, laptop computers, palm top computers and other mobile devices having appropriate circuitry, memory and wireless transmission components.

In particular, the invention provides methods of selectively distributing virtual cards between mobile devices. The methods include providing a plurality of mobile devices assigned to a plurality of users, each mobile device characterized as a computer with a user interface, memory, and running a software program, where the software program manages a user account including a collection virtual cards. The virtual cards include different profiles of a same user. The account also includes a user appearance generated from at least one virtual card for transmission to surrounding mobile devices. A visible mode and a hidden mode regulate transmission of the user appearance file and thus the availability of the user appearance on surrounding devices. To this end operating an original sending device in visible mode continually or regularly sends the user appearance for selective display on surrounding devices. A surrounding device selectively displays the user appearance only if the original sending device and the surrounding device are within a predetermined range, where upon receiving the user appearance the surrounding device searches a database of contacts to identify whether or not the user is a member of the contacts database. If the user appearance is identified as belonging to a member of the contacts database, the method further includes providing access to data stored from a previously accepted virtual card of the same user. If the user appearance is not identified as belonging to a member of the contacts database, the method further includes providing at least one selectable option of inviting the user to connect by sending a virtual card from the surrounding device to the original sending device, and selectively sending the virtual card.

After sending the virtual card, the original sending device receives it and the user selects whether to accept or deny the received virtual card. Accepting the virtual card populates a contact database with data from the accepted virtual card and provides a selectable option of sending at least one of the virtual cards from the collection of virtual cards back to the surrounding device.

As part of the selectivity of distribution, the software can selectively operate in either a visible mode, where the user appearance is visible by other surrounding devices, or a hidden mode, where the user's appearance is not visible by surrounding devices.

As further selectivity of distribution, the user of a surrounding device can increase or reduce the predetermined range to regulate the amount of incoming user appearances.

Preferably, the predetermined range is set by adjusting a gate or filter that corresponding to a radial distance from the surrounding device and is most preferably adjustable by the user of the surrounding device.

User appearance is preferably displayed on a touch screen user interface and selecting options is generally accomplished by touching or swiping a graphic on the user interface. In congested areas such as conventions, user appearance is often displayed among a pool of other user appearances from different devices. Accordingly, the methods and systems also include an ordering capability to order a pool of user appearances. As nonlimiting examples ordering approaches can include ordering by order of receipt, ordering by proximity to the surrounding device, and ordering by business field.

BRIEF DESCRIPTION OF THE DRAWINGS

Embodiments of the invention can be better understood with reference to the following drawings, which are part of the specification and represent preferred embodiments. The components in the drawings are not necessarily to scale, emphasis instead being placed upon illustrating the principles of the invention. And, in the drawings, like reference numerals designate corresponding parts throughout the several views.

DETAILED DESCRIPTION OF PREFERRED EMBODIMENTS

The invention provides new methods and systems for the selective exchange of virtual cards, such as virtual business cards including business information and virtual personal cards including personal information. Information such as business information and personal information that define the profile are generally defined as elements or data elements. Business information can include elements such as but not limited to elements of business name, a business photo, a business position, a business address, a business phone number, a business e-mail address, and a business Internet web site address. Similarly, the virtual personal card can include one or more data elements selected from the group consisting of a name, a photo, an address, a phone number, an e-mail address, and an Internet web site address.

In preferred embodiments, users generate a user appearance from at least part of a virtual card. A user appearance typically includes some data elements from the virtual card but includes less than all elements. For example, a user appearance may include a photo, name and position; whereas the virtual card may include the same elements but add a contact information, such as phone number, e-mail, fax number or address. Accordingly, the user appearance allows users to prescreen an intended audience for selected delivery of a virtual business card. To this end, generating a user appearance may include steps such as selecting which of the data elements within the virtual card are to be displayed in the user appearance. This can be performed using techniques such as check boxes next to data elements or other such approaches for making selections from a list of options while generating the user appearance. Accordingly, the artisan can choose which data elements to assign to a virtual card, which to assign to a user appearance and which are shared. Naturally, the skilled artisan will appreciate that some elements can also be shared between different cards, such as shared between a virtual business card and a virtual personal card. The virtual card and corresponding user appearance preferably remain as separate files. The skilled artisan will appreciate that while the user appearance typically includes at least some of the data elements from the virtual card, it is not limited to elements from the virtual card. That is, the user appearance can include elements not found on any of the virtual cards. This may be desired in instances where an immediate photo is desired so that users can more quickly identify each other such as by taking pictures next to local landmarks or meeting tables. In addition virtual card photos in some instances will incorporate stock corporate photos that are many years old and thus only remotely represent the user in the current environment. In still further embodiments, the user selects the photo to scroll regularly or randomly between different photos after a programmed amount of time.

In some embodiments both the virtual card and user appearance are generated on a computer then loaded on the device, such as on a mobile phone or tablet with wireless capability. The computer can be a local computer operated by the user or can be generated by interaction with a host computer, accessed by a local or terminal computer akin to a master and slave relationship, such as over the Internet. In either approach, generating a virtual card can be performed by entering identifying information or data, such as but not limited to a user's name, business name, occupation, title, address, phone number, email address, web site address or other data. Again, this information is treated as data elements and thus can be assigned an element identifier such as name, business, occupation, title, address, phone, email, web, or the other identifiers as known in the software arts. Assigning the data elements to an element identifier assists in the sorting or display of information that makes up the user appearance or virtual card and ultimately a contacts database. For example in some embodiments the user appearance may include a user photo, name, business and title thereby omitting personal contact information such as phone number and email address while a virtual card may include more personal contact information thereby facilitating further contact between users once accepted or added to a database of contacts. As such, the user appearance may include element identifiers such as name and title while the virtual card may include additional identifiers such as phone and email. From the inserted information one or more data files can be generated and loaded into the device, such as in the form of a file associated with software that sends the data as attachment or as a SMS, MMS or text file.

In other embodiments virtual cards and user appearances are generated on the device itself as individual files. In such embodiments the software application loaded on a mobile phone or tablet may permit entry of identifying information such as a user's name, business name, occupation, title, address, phone number, email address, web site address or the like. Like above, each element can be assigned to an element identifier. Alternatively, the software program may import identifying information from other programs or databases present on the device, such as through cookies, or on secondary devices communicatively connected to the device.

As eluded to above, in some embodiments the generation of a virtual card or user appearance can include a step of selecting an image from previously taken pictures or may include a step of taking a picture with the device then loading the picture as the image in the profile. The skilled artisan will appreciate that additional editing features may be present in the software such as cropping, resizing, red eye and the like conventionally associated with photography editing software.

Still further, in some embodiments the software also includes optical character recognition where a camera phone takes a picture of a physical business card, and the optical character recognition program identifies and assigns data elements to appropriate data identifiers to facilitate virtual business card formation.

Figure 1:
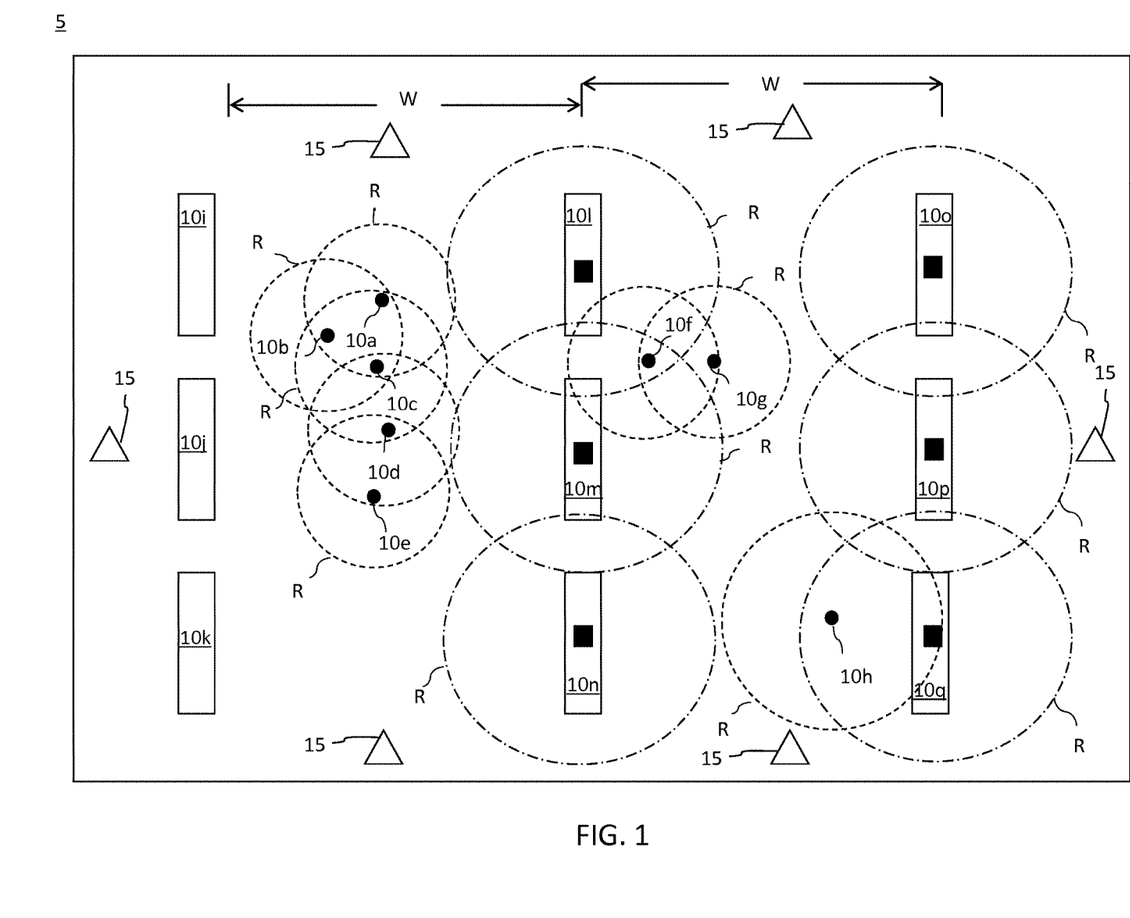
FIG. 1 provides a representative schematic of a convention room 5 where a plurality of users 10 are subdivided into attendees 10a-g interacting with a service provider 10h and a plurality of vendors 10i-q.

Turning now to FIG. 1, the invention provides methods, systems and devices to facilitate the ordered exchange of virtual cards between users 10 based on the selective interaction of user appearances within predetermined ranges R of mobile devices. This permits users 10 to more selectively screen interest in and from other users 10 nearby based on user appearances that are displayed on a mobile device.

As an example, users 10a, 10b and 10c are each within each other's predetermined ranges R and can therefore view each other's user appearance. However, while user 10c and user 10d can view each other's user appearance because they are also spatially positioned within each other's predetermined range R, user 10a and 10d can not view each other's user appearance because they are spatially positioned outside of each other's predetermined range R. As will be discussed predetermined ranges R can be expanded or contracted to selectively include or exclude users 10. For instance, users 10 in the form of service providers 10h or vendors 10l-q may set their predetermined range quite large to try and interact with as many attendees 10a-g as possible; however, attendees 10a-g may wish to be more selective in introducing themselves to others to reduce the high volume of service provider 10h or vendor 10i-q introductions. Alternatively, attendees 10a-g may set a predetermined range R roughly equivalent to a width W of an isle to selectively receive user appearances only from venders 10i-q in a same isle. As still further introduction, embodiments of the method and system incorporate filters that can order user appearances according to business field, such as doctor, lawyer, engineer, recruiter and other professional positions to sort incoming user appearances.

The skilled artisan will appreciate that the wireless transfer of data can be performed using known data transfer technologies, in particular, technologies that use short wave transmission. An exemplary technology that utilizes short wave transmission is BLUETOOTH. Other technologies that permit the regulation of transmission of data between devices within the predetermined range R may also be used. The term "predetermined range" as used herein refers to an area surrounding the user's device that the user selects for permitting the receipt and transmission of user appearance and/or virtual cards. In preferred embodiments, the "predetermined range" operates as an electronic gate by filtering out user appearances that do not meet a distance criteria. In such embodiments the "predetermined range" can be selectively increased or decreased by the user through suitable switches, dials, scroll bars or other features on the device to adjust the distance criteria. In other embodiments, a "predetermined range" is defined by the transmission wavelength. In some embodiments the user appearance is selectively displayed when communicating devices are within a predetermined range R of 50 ft. More preferably, the user appearance is selectively displayed when communicating devices are within a predetermined range R of 25 ft. In some embodiments the user appearance is selectively displayed when communicating devices are within a predetermined range R of 10 ft. Actively adjusting the predetermined range in real time may be especially useful in events such as trade shows or business networking events were multiple vendors 10i-q or service providers 10h are transmitting user appearances, while attendees 10a-g may wish to only receive user appearances from other attendees 10a-g, vendors 10i-q, or service providers 10h in close proximity, such as within 10 ft. The "predetermined range" extends radially outward from the position of the user's 10 device to form an area in which incoming user appearances will be accepted for display. By limiting the transfer of user appearances to within a predetermined range R and permitting the user to adjust the distance or area of the predetermined range R, the user 10 is not overloaded with user appearances in highly congested areas.

As a further advancement of the methods and systems, an approaches have been developed to determine the relative positioning of two users 10 and filter the display of user appearances according to proximity to the user 10 such that the nearest user's 10 user appearance is flagged as nearest. In other words, in congested environments such as conventions and trade shows the user appearance of attendees 10a-g may be displayed among a pool of other user appearances from multiple attendees 10a-g through their different devices. By filtering user appearances according to relative position the pool of user appearances can be ordered, thereby permitting user appearances of closest users 10 to be easily identified.

Ordering user appearances according to proximity can be performed by determining and comparing distances between two points in a Cartesian coordinate system, where the points are longitude and latitude values akin to global satellite positioning (gps) or through relative position coordinates triangulated through the use of local transmitters 15. In an alternative approach, proximity can be determined based on signal strength, where devices emitting a same frequency can be prioritized such that received signals of greater strength are prioritized over signals with lower signal strength. This approach also permits further adjustment to the predetermined range R by selecting for signals of a particular strength by selectively gating or filtering out relatively weaker signals. To this end, the user appearances actually increase face to face user 10 interaction with a targeted audience.

Although ordering or sorting user appearances according to relative distance or position is preferred other approaches can also be used. In some embodiments user appearances are ordered according to time of receipt such that user appearances received earlier are prioritized over user appearances received later. This approach can be embodied using time stamping or sequential ordering as known in the art. In still another approach ordering is performed according to a data element, such as business field. This approach permits a user 10 to identify members of different fields to prioritize contact with those in a field of interest.

In further embodiments, the users 10 transmitting user appearances are also grouped according to whether or not the user 10 has been previously added or accepted into a database, such as a contacts database. Maintaining the database can be performed by tagging data elements with data identifiers for proper population or using other methods. In a further embodiment, previously accepted users 10 or user appearances are provided on one side of a display and the users 10 which have not yet been added are provided on the other side of the screen. To this end, the user interface may appear akin to a grid where user appearances of nearest users are prioritized vertically and user appearances for users already collected in the database can be prioritized horizontally. This permits the quick visual identification of previous contacts in a crowd.

Although the user appearances can be reviewed on the user's device, the content of the user appearance is preferably not downloaded into the memory of the device for long term storage. That is, the user appearance is temporarily displayed only while the receiving device is within the predetermined range. This can be accomplished using technologies known to those of ordinary skill in the art, such as through the use of JavaScript Object Notation (JSON). Therefore a second user must perform an action while the first user is within the predetermined range. In embodiments where a user 10 has selected a take my card mode (shown in FIG. 5), a virtual card may be directly downloaded into memory without requesting additional authorization by the user 10. In other embodiments, once an action is performed data from a user appearance is stored in a request directory, which optionally populates the database of contacts.

In preferred embodiments, performing an action in response to the presence of a user appearance includes sending a return virtual card to the first user where the return virtual card includes information such as personal information or business information regarding the second user, and accessing a database of contacts to display a previous file of the first user already saved.

Ultimate acceptance or receipt of a virtual cards preferably results in populating a database of contacts so that a user 10 may send messages directly to connected users 10 through electronic mail, phone, text, or other communication routes without typing a delivery address or phone number using autofill technologies known in the art. The database may also be linked to previous sales orders, purchased products or other user specific information.

EXAMPLES

Below we provide examples for a variety of scenarios that may occur while attending a trade show with attendees 10a-g, service providers 10h, and vendors 10g-q.

Example 1: Exchange of a Virtual Business Card Using a Permission Request

Referring to FIG. 1, attendees 10c, 10d, and 10e each having a mobile phone loaded with suitable software for conducting the following method. The software displays a first column, which is designated "users", that refers generally to devices within a predetermined range that are transmitting data in the form of a user appearances. In a second column, which is designated "contacts", a listing of users are displayed within the predetermined range that are transmitting user appearances and that have previously been added to the database of contacts on the device. Further, in each column the user appearances are arranged such that the corresponding users that are nearest are displayed at the top of the display. Since each user has a user appearance, the uppermost user appearance of the second column (contacts) is typically the user's own user appearance. In some embodiments, this feature is turned off.

Attendee 10d can select the user appearance of either attendee 10c or attendee 10e by swiping the corresponding user appearance into the contacts column. Typically, the column will be reordered such that users 10 that have been accepted but not validated are positioned at the top of the list. Swiping attendee 10e to the contacts column results in the display of a status indicator, which indicates status is pending because adding attendee 10e to the contacts of attendee 10d has not been validated by attendee 10e.

Swiping attendee 10e to the contacts column launches a screen to select a virtual card followed by sending the selected virtual card to attendee 10e for adding attendee 10d to the contact list of attendee 10e. Attendee 10e receives an alert or request, typically displayed in the user's column.

Once receiving the virtual card from attendee 10d the attendee 10e is provided with an option of accepting the virtual card or denying the card. Accepting the request can be performed by swiping attendee's 10d virtual card into the "contacts" column thereby designating the requesting attendee 10d as a contact. Upon designating the attendee 10d as a contact, the attendee 10e may send a virtual card to attendee 10d for population in a database of contacts.

In some embodiments, additional information about the requesting attendee 10c is desired prior to accepting the request. In such instances, a attendee 10e may select to view a complete or more complete profile of the requesting attendee 10c prior to acceptance or refusal of the request. In such an embodiment, the requesting attendee 10c may send a virtual business card together with the request.

Example 2: Selective Communication Between Two Users Among a Pool of Users

Referring to FIG. 1, attendee 10a, 10b, and 10c are standing in a convention room 5 at varying distances from each other. Each of these attendee 10a-c is operating a device capable of running a virtual card exchange software application, and each device is compatible with a system of transponders 15 located in along walls of the convention room 5. In particular, attendee 10a is standing within predetermined ranges R of both attendee 10b and attendee 10c thereby permitting the transfer and display of appearances and virtual cards.

Figure 2A:
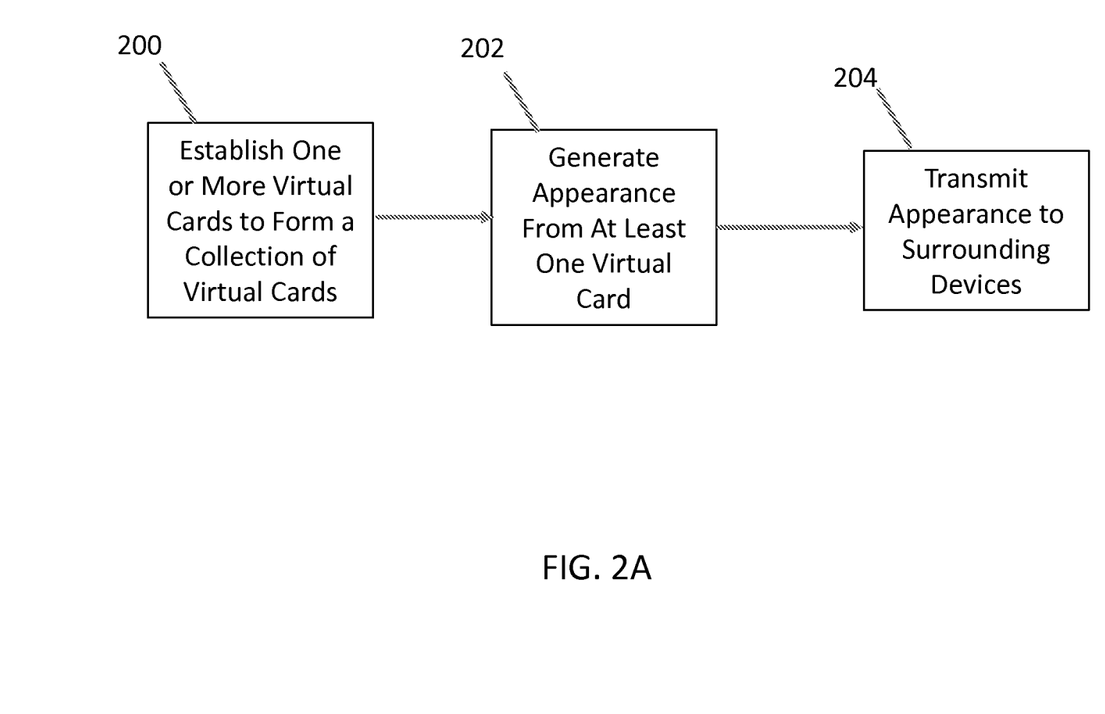
FIG. 2A is a flowchart depicting set up of a collection of virtual cards and generating an appearance from at least one virtual card

In cooperation with the flowchart in FIG. 2A, prior to the event, attendees 10a-c have established one or more virtual cards 200 through various means including the electronic processing of physical business cards to populate the various data fields, creating them manually through a GUI interface that the application provides, creating them on a computer, and selecting the default business card. From there, they have generated an appearance from at least one of the cards in the collection of virtual cards created 202. Finally, prior to the trade show, they have enabled the transmission of the generated appearance so that they would be permitted to send and receive cards during the trade show 204.

Figure 2B:
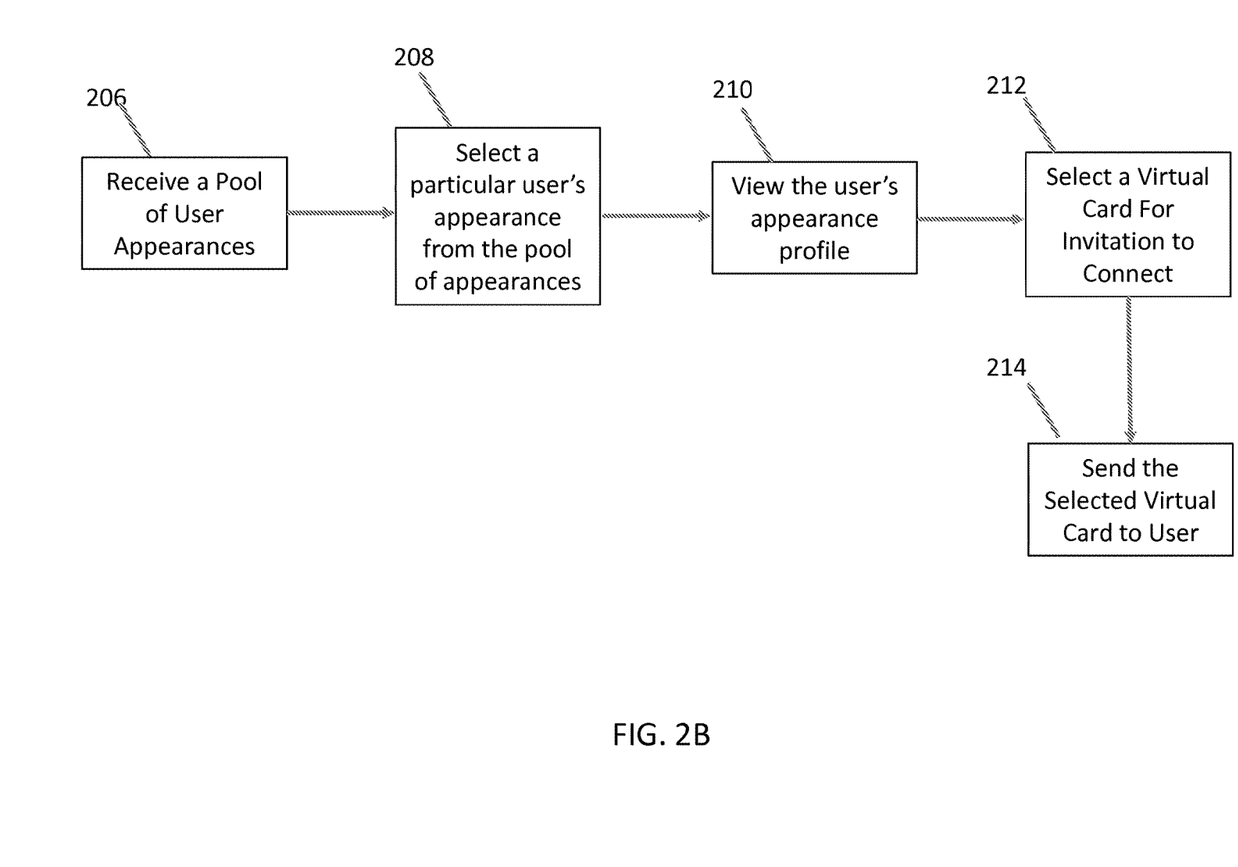
FIG. 2B is a flowchart depicting selecting a user from a pool of user appearances and sending a virtual card to the user.

In cooperation with the flowchart in FIG. 2B, attendee 10a receives a pool of nearby user appearances 206. From this he selects a particular attendee 10b by clicking the user's photo or swiping the bar to the right 208. After which he views the attendee's 10b appearance profile and any listed fields that attendee 10b has selectively chosen to show 210. After which, the attendee 10a decides to select a virtual card as an invitation to connect and add attendee 10b to his list of contacts 212. After selecting the virtual card, attendee 10a sends it through.

Figure 3A:
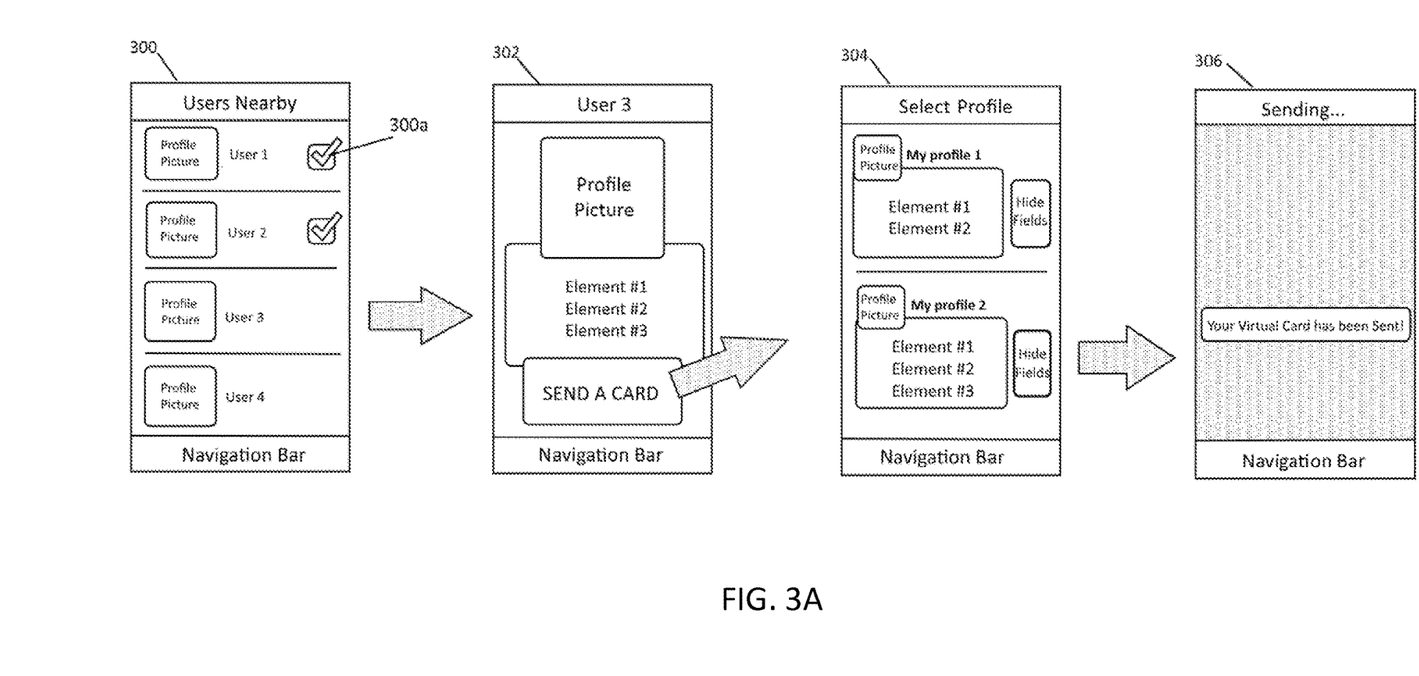
FIG. 3A is a series of abstracted screen shots showing the ordering and selection of a user appearance.

Adding abstracted screen captures in FIG. 3A, item 300 shows the user pool from which attendee 10a selects a attendee 10b to interact with. Attendee 10a verifies by the absence of a check mark that the attendee 10b is not currently listed in his contact list. Then attendee 10a reviews the appearance of attendee 10b in item 302. After which, attendee 10a opts to send attendee 10b a virtual card by selecting the "Send Card" button 302, then selects a profile of his choosing 304. After successful transmission, attendee 10a receives a toast that the profile has been successfully sent 306.

Example 3: Response to Receiving Card from User

Figure 2C:
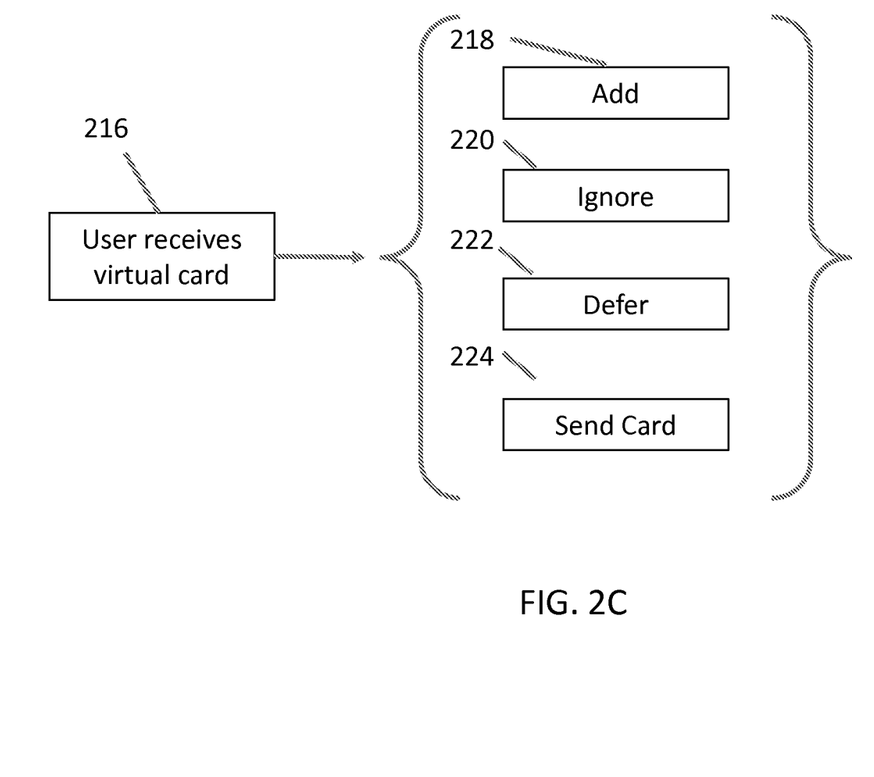
FIG. 2C is a flowchart depicting the receipt of a virtual card and choosing a response.
Figure 3B:
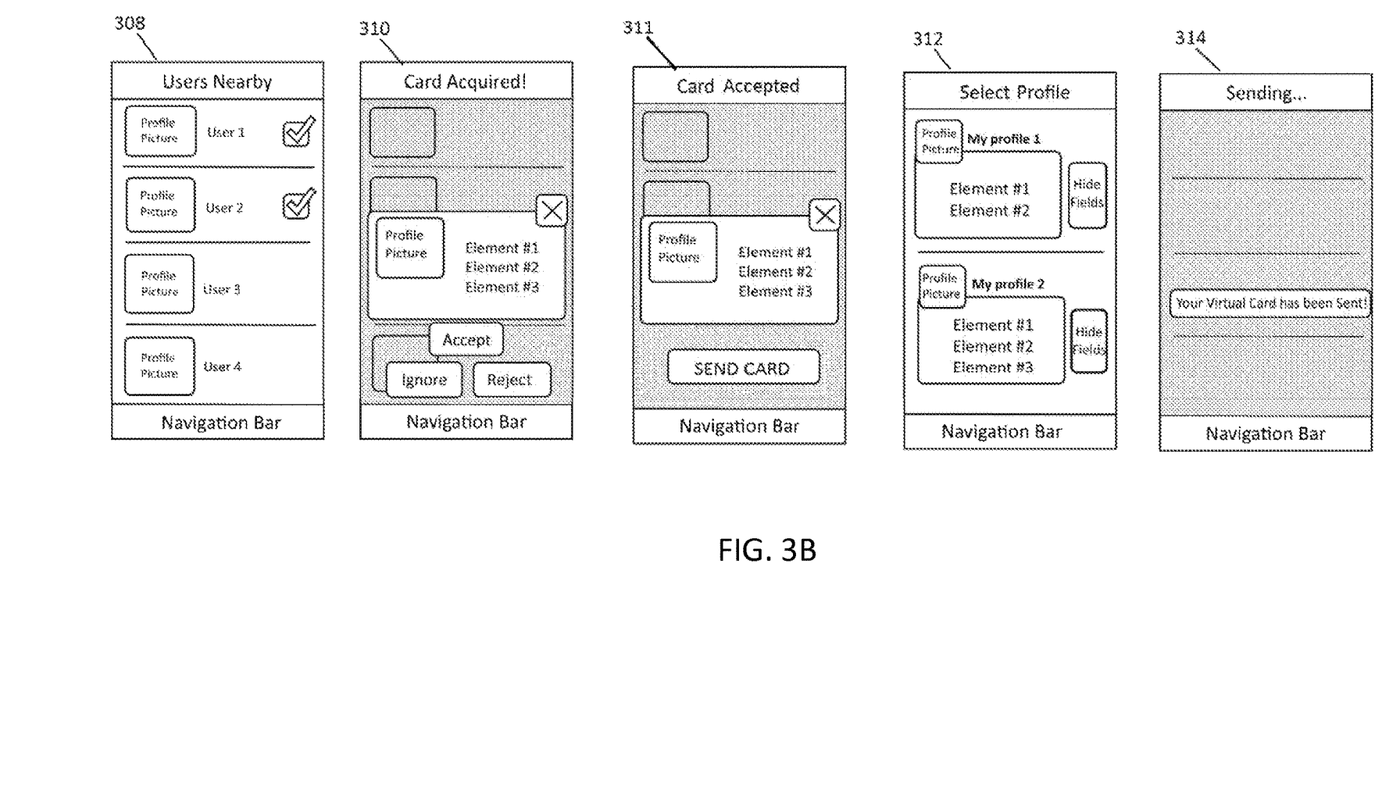
FIG. 3B is a series of abstracted screen shots showing the receipt of a virtual business card.

Following the flowchart in FIG. 2C, and the added abstracted screen captures FIG. 3B, attendee 10b receives a virtual card from attendee 10a, 216 and is presented a view of the attendee's 10a virtual card 310. Attendee 10b then has the option to ignore the card 220, add the card to attendee's 10b list of contacts, send a card back 224, or defer this choice to a more convenient time 222. In this instance, attendee 10b decides to add attendee's 10a card 224, by hitting the select button 310 and elects to respond with a virtual card of her own 224. In order to do so, she presses the "Send Card" button 311 then selects a virtual card 312 and sends it 314.

Example 4: Rejecting a Request

With reference to FIGS. 1 and 2B, attendee 10c is calculated by the application with the aid of the transponders 5 to be near attendee 10a and thus appears in attendee's 10a pool of appearances 206. Attendee 10a selects attendee's 10c appearance 208 and is summarily presented a view of attendee's 10c appearance 210. Attendee 10c selects a virtual 212 card to send user 10c. Then he commits the transmission of the selected virtual card 214.

In view of FIG. 2C, user 10c receives a virtual card 216. Attendee 10c elects to ignore the virtual card 220 by selecting the appropriate button in 310, and not proceeding the card select 312 and sending 314 method steps.

Example 5: Interaction of Vendors Tailoring Virtual Cards to Users

With reference to FIGS. 1 and 2B, attendee 10f is within the sending range of vendor 10l, and therefore appears in vendor's 10l pool of user appearances 206. Vendor 10l selects attendee 10f from the pool of appearances, skims the profile 210, and selects a virtual card tailored to attendee's 10f apparent tastes in box 212. After this, vendor 10l sends the selected virtual card to attendee 10c.

Example 6: Adding to Contact List

Upon receiving vendor's 10l virtual card 216, attendee 10f views vendor's 10l appearance, accepts the virtual card 310, to his collection and elects to respond with a card of his own 312.

Upon receipt of attendee 10f virtual card, after accepting it and adding it to the contacts database 310, 218 vendor 10l finds that attendee 10f is now flagged as being in the contacts database 300a, and at any time the vendor may choose to review vendor's 10l saved profile.

Example 7: Reviewing Saved Profiles

In view of the abstracted screen capture 400 in FIG. 4, at a later opportunity after the convention, vendor 10l reviews vendor's 10f saved profile 402.

Example 8: Adjusting a Predetermined Range

As shown in FIG. 1, attendee 10h is increasing his range so as to be within the range of vender 10q. Following FIG. 5, attendee 10h selects the "Change Ranges" option in 500 (FIG. 5), which then turns into a sliding bar which can be slid to the right in order to increase the range, or slid to the left to decrease the range. The act of lowering or increasing the range can be changed according to the normal means with which a mobile applications skilled artisan can represent this particular bit of functionality.

Example 9: Selecting a Default Appearance

Figure 4:
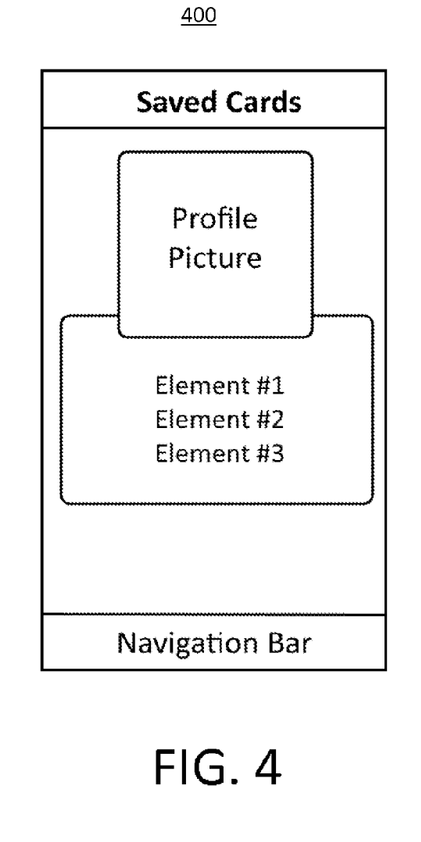
FIG. 4 is an abstracted screen shot showing a saved virtual card.

With reference to FIG. 4, attendee 10h wishes to alter his default appearance in order to impress the vendor 10q. He does so by navigating to the Setting screen 500, pushing the requisite "Select" button 500a, then selecting the profile from a horizontal layout in 502.

Example 10: Hiding Fields from a Profile

With reference to FIG. 4, attendee 10h wishes to hide a few of the fields of the profile that he has chosen in Example 9. As such, he navigates to the Settings screen 500, pushes the button labeled "Hide Fields" 500b, and is taken to a horizontal layout of checkboxes and elements wherein he selects the elements that he wishes to hide on this selected profile 504 in order to fine-tune his appearance.

Example 11: Vendors Choosing Take My Card Mode or Hiding Fields

Figure 5:
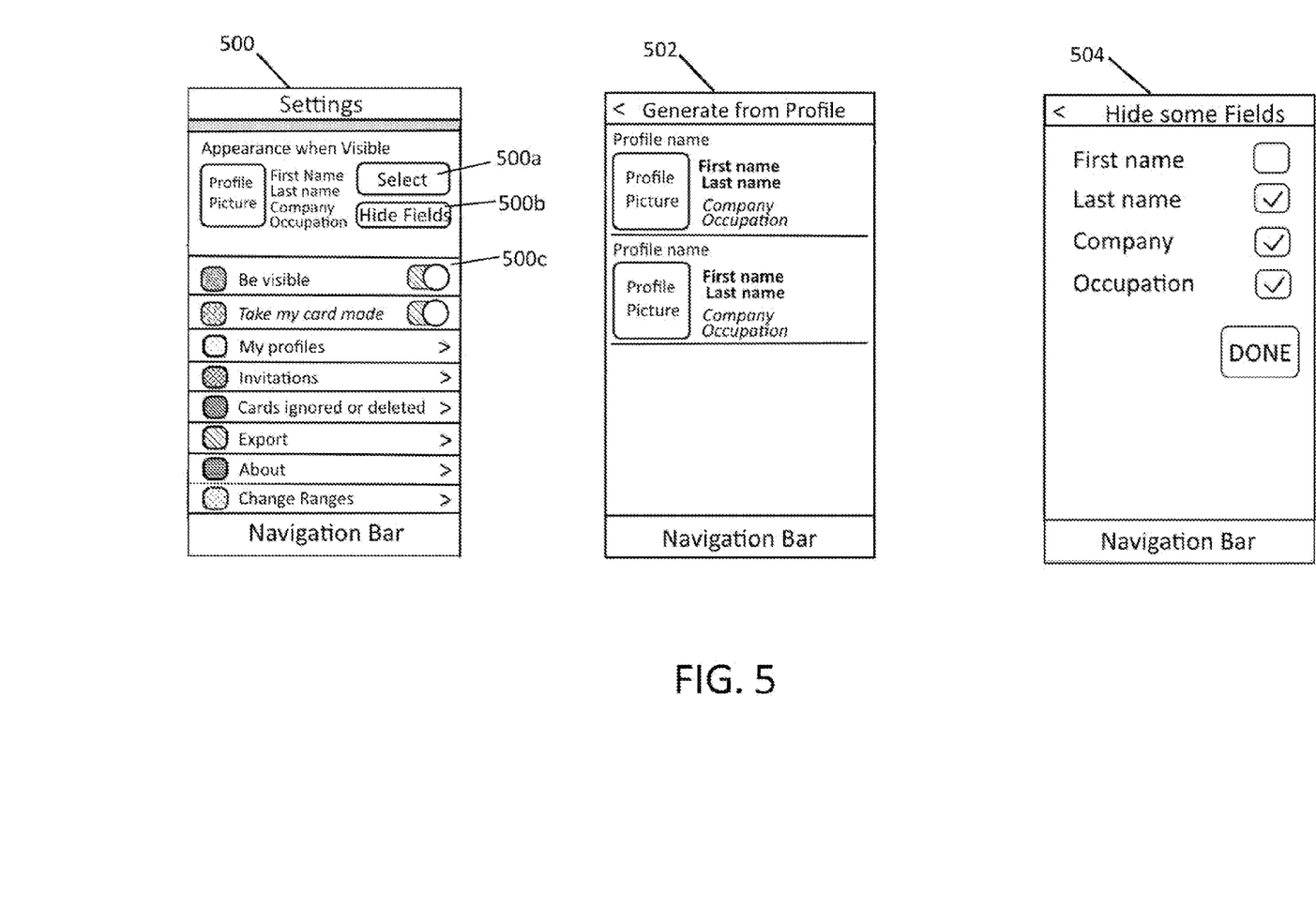
FIG. 5 is a series of abstracted screen shots showing setting options.

With reference to FIGS. 1 and 5, vendor 10n chooses to distribute a virtual card without requiring further authentication and therefore selects take my card mode as shown in FIG. 5. Meanwhile neighboring vendor 10m reduces the complexity of his user appearance for approaching attendee 10f by hiding certain fields by selecting the hide fields option 500b, 504 and deselecting a box corresponding to address.

What is claimed is:

1. A method of selectively distributing virtual cards between mobile devices, comprising:
    a) providing a plurality of mobile devices assigned to a plurality of users, each mobile device characterized as a computer with a user interface, memory, and running a software program, wherein the software program manages a user account comprising a collection virtual cards, wherein the virtual cards include different profiles of a same user, wherein the account further comprises a user appearance generated from at least one virtual card for transmission to surrounding mobile devices, the account further comprising a visible mode and a hidden mode to regulate availability of the user appearance on surrounding devices;
    b) operating an original sending device in visible mode to continually send the user appearance;
    c) selectively displaying the user appearance on a surrounding device only if the original sending device and surrounding device are within a predetermined range, wherein upon receiving the user appearance the surrounding device searches a database of contacts to identify whether the user is a member of the contacts database;
    wherein received user appearances are displayed in order of proximity;
    wherein if the user appearance is identified as belonging to a member of the contacts database, the method further comprises providing access to data stored from a previously accepted virtual card of the user;

wherein if the user appearance is not identified as belonging to a member of the contacts database, the method further comprises providing at least one selectable option comprising inviting the user to connect by sending a virtual card from the surrounding device to the original sending device, and selectively sending the virtual card;

wherein the virtual card is selectively sent from the surrounding device comprising:
d) receiving the virtual card by the original sending device; and
e) selecting whether to accept or deny the received virtual card, wherein accepting the virtual card populates a contact database with data from the accepted virtual card and provides a selectable option of sending at least one of the virtual cards from the a collection of different virtual cards having different profiles of a same user and available to be sent from the surrounding device.

2. The method according to claim 1, wherein the mobile devices are independently selected from the group consisting of a mobile phone, a tablet computer, a laptop computer, and a palm top computer.

3. The method according to claim 1, wherein the predetermined range is a radial distance from the surrounding device and is adjustable by the user of the surrounding device, wherein the adjustment comprises applying a gate to filter out weakest signals.

4. The method according to claim 3, wherein the predetermined range is adjusted by sliding a displayed scroll bar to match a desired range.

5. The method according to claim 1, wherein the collection of virtual cards comprises a virtual business card comprising a business profile and a different virtual personal card comprising a personal profile.

6. The method according to claim 5, wherein the virtual personal card comprises one or more data elements selected from the group consisting of a name, a photo, an address, a phone number, an e-mail address, and an Internet web site address.

7. The method according to claim 5, wherein the virtual business card comprises one or more data elements selected from the group consisting of a business name, a business photo, a business position, a business address, a business phone number, a business e-mail address, and a business Internet web site address.

8. The method according to claim 1, wherein the user appearance shares at least one data element with the virtual card.

9. The method according to claim 1, wherein user appearance is displayed on a touch screen user interface, the method further comprising selecting the selectable option by touching or swiping a graphic on the user interface.

10. The method according to claim 1, wherein the user appearance is displayed among a pool of other user appearances from different devices.

11. The method according to claim 1, wherein the step of inviting the user to connect further comprises sending a verification code for return to the surrounding device with the virtual card, wherein the verification code is readable by the surrounding device to authenticate a response from the original sending device.

12. The method according to claim 1, wherein the step of inviting the user to connect further comprises the step of populating the contacts database with data from the user appearance.

13. The method according to claim 12, wherein the data is assigned to an acceptance identifier, optionally with further identifying information selected from the group consisting of time, location and business field.

14. The method according to claim 1, wherein user accepted appearances are provided on one side of a display and appearances of users which have not yet been accepted appear on another side of the display.

15. The method according to claim 1, wherein the selectable option of sending at least one of the virtual cards from the collection of virtual cards to the surrounding device, comprises selecting from different available virtual cards having difference profiles of the same user.

16. The method according to claim 1, wherein the displayed user appearances are regularly updated to maintain the order according to proximity of the corresponding mobile device.

17. The method according to claim 1, wherein the database of contacts is maintained on the device.

18. The method according to claim 1, wherein the virtual card is sent directly between devices.

* * * * *